United States Patent
Alhorn et al.

(10) Patent No.: US 9,632,491 B1
(45) Date of Patent: Apr. 25, 2017

(54) RECONFIGURABLE DRIVE CURRENT SYSTEM

(71) Applicant: The United States of America as Represented by the Administrator of the National Aeronautics and Space Administration, Washington, DC (US)

(72) Inventors: Dean C. Alhorn, Huntsville, AL (US); Kenneth R. Dutton, Athens, AL (US); David E. Howard, Hazel Green, AL (US); Dennis A. Smith, Athens, AL (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 316 days.

(21) Appl. No.: 14/308,312

(22) Filed: Jun. 18, 2014

(51) Int. Cl.
  *H02M 7/5387* (2007.01)
  *H02M 3/157* (2006.01)
  *G05B 15/02* (2006.01)

(52) U.S. Cl.
  CPC ............ *G05B 15/02* (2013.01); *H02M 3/157* (2013.01); *H02M 7/53873* (2013.01)

(58) Field of Classification Search
  CPC ........... H02M 7/5387; H02M 7/53871; H02M 7/53873; H02M 3/156; H02M 3/157
  USPC .................................. 327/108–112; 323/283
  See application file for complete search history.

(56) References Cited

U.S. PATENT DOCUMENTS

| | | | | |
|---|---|---|---|---|
| 4,622,499 A * | 11/1986 | Squires | ..................... | H02P 6/17 318/269 |
| 5,153,522 A * | 10/1992 | Sano | ..................... | G01R 31/06 324/418 |
| 6,762,745 B1 * | 7/2004 | Braun | ..................... | G06F 3/016 318/568.11 |
| 7,277,763 B2 | 10/2007 | Burkatovsky | | |
| 8,699,533 B1 * | 4/2014 | Wach | ................... | H01S 5/02212 372/34 |
| 2004/0046535 A1 * | 3/2004 | Duffy | .................... | H02M 3/157 323/283 |
| 2007/0070667 A1 * | 3/2007 | Stancu | .................... | H02M 1/32 363/132 |
| 2007/0138299 A1 * | 6/2007 | Mitra | ................. | G06K 19/0719 235/492 |
| 2007/0200538 A1 * | 8/2007 | Tang | ..................... | H02M 3/157 323/237 |
| 2008/0174472 A1 | 7/2008 | Stone et al. | | |

(Continued)

*Primary Examiner* — Jessica Han
*Assistant Examiner* — David A. Singh
(74) *Attorney, Agent, or Firm* — Peter J. Van Bergen; James J. McGroary

(57) ABSTRACT

A reconfigurable drive current system includes drive stages, each of which includes a high-side transistor and a low-side transistor in a totem pole configuration. A current monitor is coupled to an output of each drive stage. Input channels are provided to receive input signals. A processor is coupled to the input channels and to each current monitor for generating at least one drive signal using at least one of the input signals and current measured by at least one of the current monitors. A pulse width modulation generator is coupled to the processor and each drive stage for varying the drive signals as a function of time prior to being supplied to at least one of the drive stages.

20 Claims, 5 Drawing Sheets

(56) References Cited

U.S. PATENT DOCUMENTS

| | | | | |
|---|---|---|---|---|
| 2010/0109632 A1* | 5/2010 | Kwan | ............... | H02M 3/157 323/283 |
| 2013/0188399 A1* | 7/2013 | Tang | ............... | H02M 3/335 363/21.1 |
| 2013/0235630 A1* | 9/2013 | Sadwick | ............... | H02M 3/335 363/74 |
| 2014/0266111 A1* | 9/2014 | Lee | ............... | H02M 3/1584 323/282 |
| 2015/0333684 A1* | 11/2015 | Savage, II | ............... | H02P 6/04 318/135 |

* cited by examiner

RECONFIGURABLE DRIVE CURRENT SYSTEM

ORIGIN OF THE INVENTION

The invention described herein was made in the performance of work under a NASA contract and by an employee of the United States Government and is subject to the provisions of Section 20135(b) of the National Aeronautics and Space Act, Public Law 111-314, §3 (124 Stat. 3330, 51 U.S.C. Chapter 201), and may be manufactured and used by or for the Government for governmental purposes without the payment of any royalties thereon or therefore.

BACKGROUND OF THE INVENTION

1. Field of the Invention

This invention relates to systems generating drive currents. More specifically, the invention is a reconfigurable drive current system that is readily adapted to provide adjustable amounts of drive current to a variety of systems having different drive current needs.

2. Description of the Related Art

Spacecraft avionics utilize drive electronics to supply drive current to a variety of spacecraft systems to include motors (e.g., brushless, DC, stepper, hybrid, etc.), valves, solenoids, thermostats, heaters, pin pullers, pyro igniters, etc. Each time a new spacecraft system is designed or updated, the spacecraft's drive avionics that support that system are designed/redesigned and then tested for functionality. This cycle is repeated for every new spacecraft system at the expense of developer time, manpower and money.

SUMMARY OF THE INVENTION

Accordingly, it is an object of the present invention to provide a drive current system for use in spacecraft avionics.

Another object of the present invention is to provide a reconfigurable drive current system adaptable for use with a variety of spacecraft systems.

Other objects and advantages of the present invention will become more obvious hereinafter in the specification and drawings.

In accordance with the present invention, a reconfigurable drive current system includes a plurality of drive stages. Each drive stage includes a high-side transistor and a low-side transistor in a totem pole configuration. A current monitor is coupled to an output of each of a corresponding one of the drive stages to measure current produced by the corresponding drive stage. Input channels are provided to receive input signals. The input channels include a first channel adapted to receive digital input signals, a second channel adapted to receive rotary position input signals, and a third channel adapted to receive analog input signals. A processor is coupled to the input channels and to each current monitor for generating at least one drive signal using at least one of the input signals and current measured by at least one of the current monitors. A pulse width modulation generator is coupled to the processor and each drive stage for varying the drive signals as a function of time prior to being supplied to at least one of the drive stages.

BRIEF DESCRIPTION OF THE DRAWING(S)

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
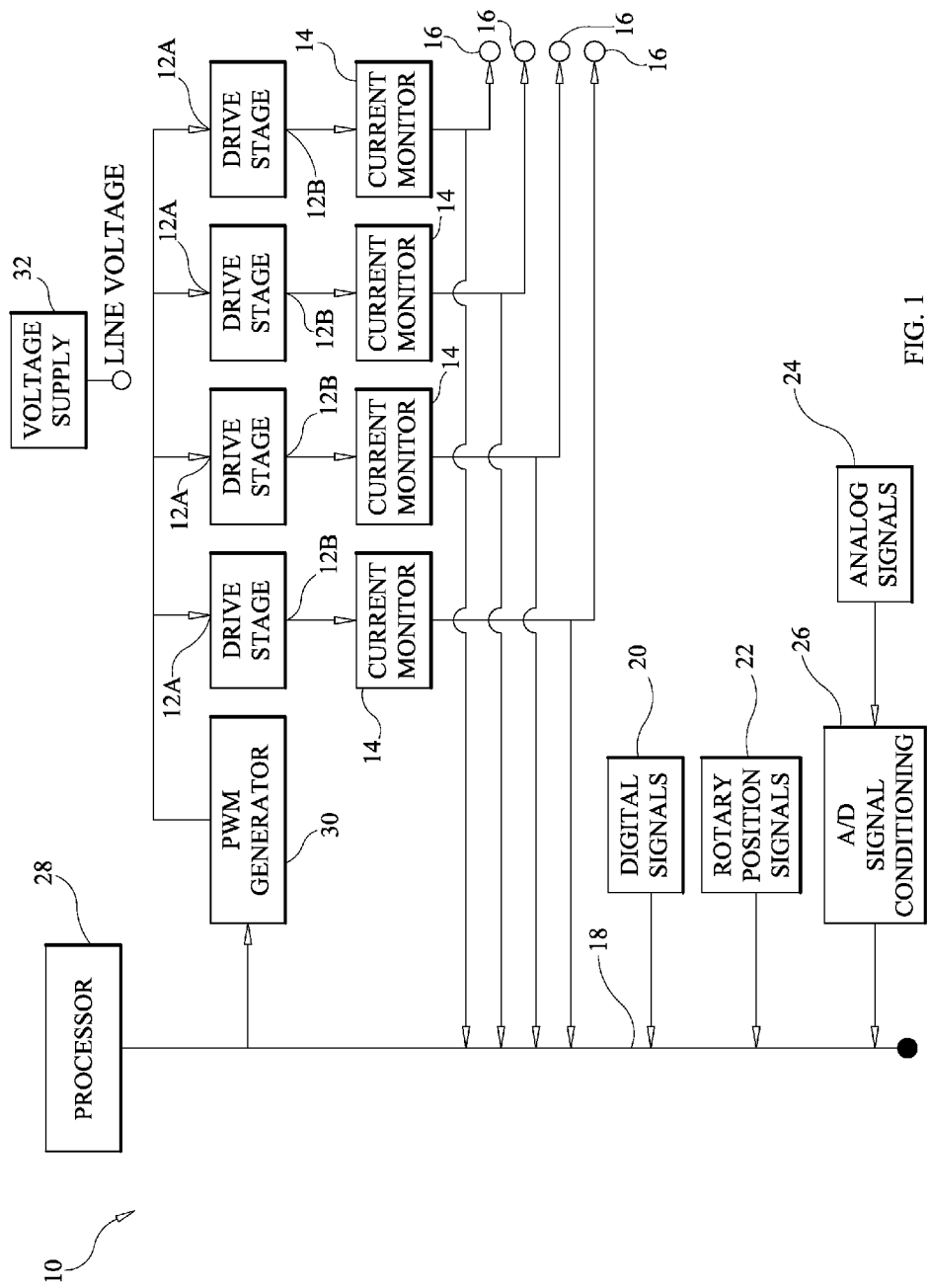
FIG. 1 is a block diagram of a reconfigurable drive current system in accordance with an embodiment of the present invention.

Referring now to the drawings and more particularly to FIG. 1, a block diagram of a reconfigurable drive current system in accordance with an embodiment of the present invention is shown and is referenced generally by numeral 10. As will be explained further below, drive current system 10 can be configured in a variety of ways to provide controllable drive current(s) to a variety of systems. By way of example, such systems include a spacecraft's motors, valves, solenoids, thermostats, heaters, pin pullers, pyro igniters, etc. A great advantage of the present invention is that it can be readily configured to provide variable drive currents for single-phase systems, two-phase systems, bi-directional systems, or three-phase systems. Furthermore, system 10 is readily configured to work with a variety of spacecraft avionic designs.

System 10 includes a plurality of drive stages 12 (e.g., four are shown in the illustrated embodiment although more or fewer can be used without departing from the scope of the present invention), each of which has an input 12A and an output 12B. Coupled to each output 12B is a current monitor 14 for measuring electric current being supplied to a terminal 16 of a device that is to be powered by such electric current. A bus 18 receives input signals generated from one or more devices/sensors (not shown but located onboard a spacecraft) used to monitor/measure a system's state or output. The monitored/measured system's state/output is associated with a device(s) coupled to one or more terminals 16 receiving electric current generated by one or more drive stages 12. The input signals can include one or more of digital signals 20 (e.g., digital "heartbeat" pulses, simple alarm inputs, signals generated by optical encoders, analog-to-digital converters, resolvers with resolver-to-digital converter, etc.), rotary position signals 22 (e.g., outputs from encoders, resolvers, etc.), and analog signals 24 (e.g., signals generated by thermistors, resistance-temperature detectors, current monitors, tachometers, accelerometers, inclinometers, gyroscopes, digital-to-analog converters, pressure sensors, etc.). Analog-to-digital ("A/D") signal conditioning electronics 26 can be provided to convert analog signals 24 to a digital format prior to placement on bus 18.

A programmable controller/processor 28 is coupled to bus 18 for receiving input signals 20, rotary position signals 22, and/or analog signals 24. Programmable processor 28 is programmed to control the operation of system 10 based on a particular configuration thereof and the type(s) of device(s) coupled to terminals 16. A variety of exemplary configurations will be described later herein. In general, processor 28 generates a drive signal for one or more of drive stages 12 (depending on the configuration of system 10) based on one or more input signals 20/22/24 and the electric current measured by one or more of current monitors 14. In other words, processor 28 generates feedback-control drive signal(s) for the one or more drive stages 12 supplying electric current to the one or more device terminals 16.

The feedback-control drive signals generated by processor 28 can be conditioned prior to being provided to one or more drive stages 12. In general, the conditioning of the drive signals is used to adjust or vary the drive signals as a function of time. By doing so, the electric current produced by drive stages 12 can be adjusted. More specifically, a pulse width modulation generator 30 is used to adjust the amount of time a drive signal is applied to a drive stage 12 to thereby control electric current output of a drive stage.

Figure 2:
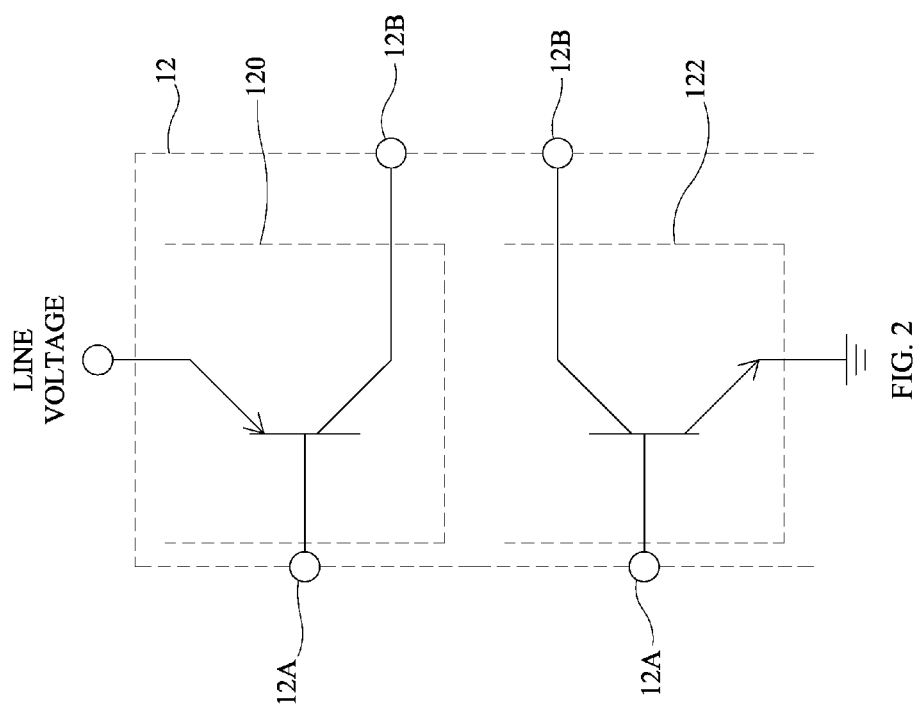
FIG. 2 is a circuit schematic of a drive stage's high-side and low-side transistors in a totem pole circuit configuration in accordance with an embodiment of the present invention.

Referring additionally now to FIG. 2, each of drive stages 12 includes two transistors 120 and 122 that can be field-effect-type (e.g., FET, MOSFET, etc.) "PNP" and "NPN" transistors, respectively. However, the present invention is not so limited as other types of transistors can be used without departing from the scope of the present invention. In the present invention, transistors 120 and 122 are connected to define an H-bridge circuit configuration. For example, in the illustrated embodiment, transistor 120 is the H-bridge circuit's high-side transistor coupled to line voltage. Such line voltage can be provided by, for example, a voltage supply 32 (FIG. 1) coupled to each of drive stages 12. Transistor 122 is the H-bridge circuit's low-side transistor coupled to ground potential. Since the H-bridge circuit is an on/off type of current drive, the electric current at output 12B can be varied by varying the "on" time at inputs 12A. Such "on" time can be controlled using pulse width modulation generator 30 as described above.

Figure 3:
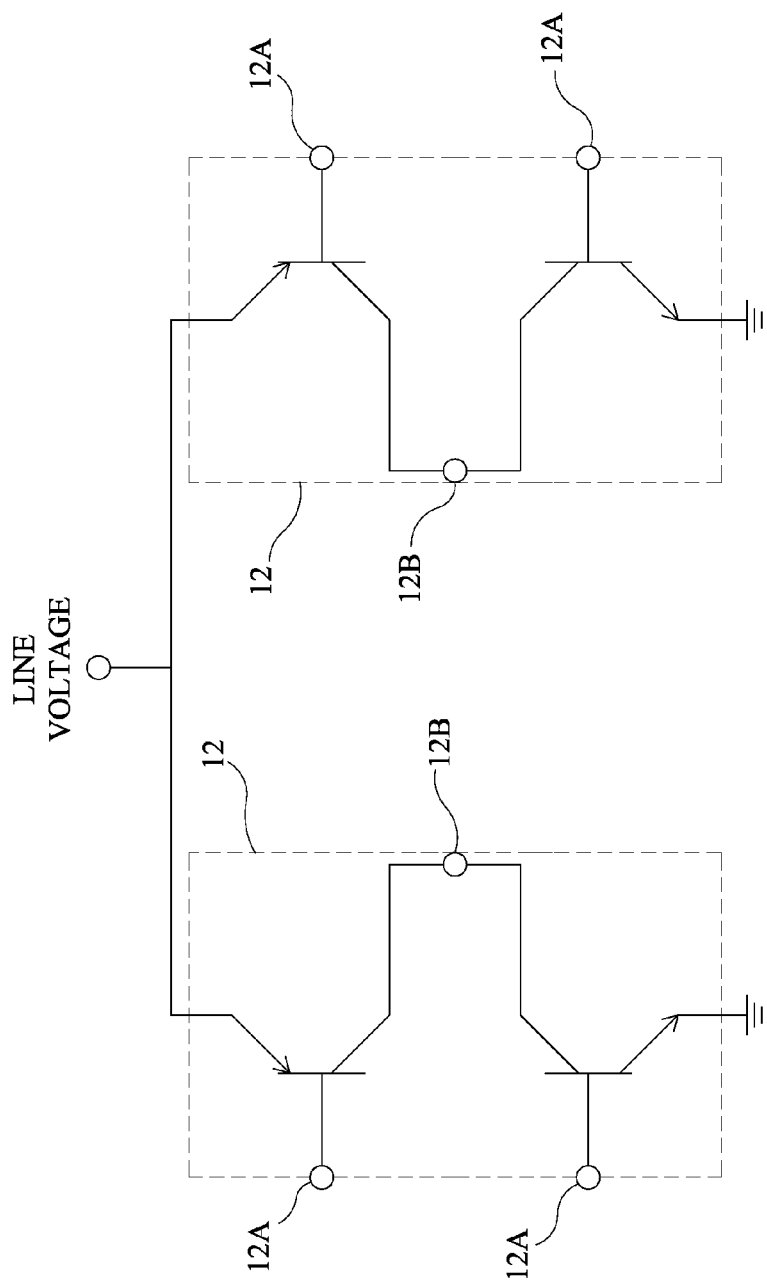
FIG. 3 is a circuit schematic of two drive stages' high-side and low-side transistors in an H-bridge circuit configuration providing a bi-directional current in accordance with another embodiment of the present invention.

System 10 is not limited to use of a single drive stage 12 to support a single device coupled to a corresponding device terminal 16. Indeed, a great advantage of the present invention is its ability to be configured to use a plurality of drive stages 12 in combination to provide drive current for a variety of devices. For example, FIG. 3 illustrates two drive stages 12 coupled to one another with each one defining an H-bridge circuit configuration as described above. A device (not shown) to be driven by current is coupled between the stages' outputs 12B. This configuration provides for bi-directional current flow between the stages' outputs 12B predicated on the drive signals applied to the stages' inputs 12A. In another application, two of the configurations illustrated in FIG. 3 could be used where each configuration is used to feed one phase of a two-phase device such as a stepper motor.

Figure 4:
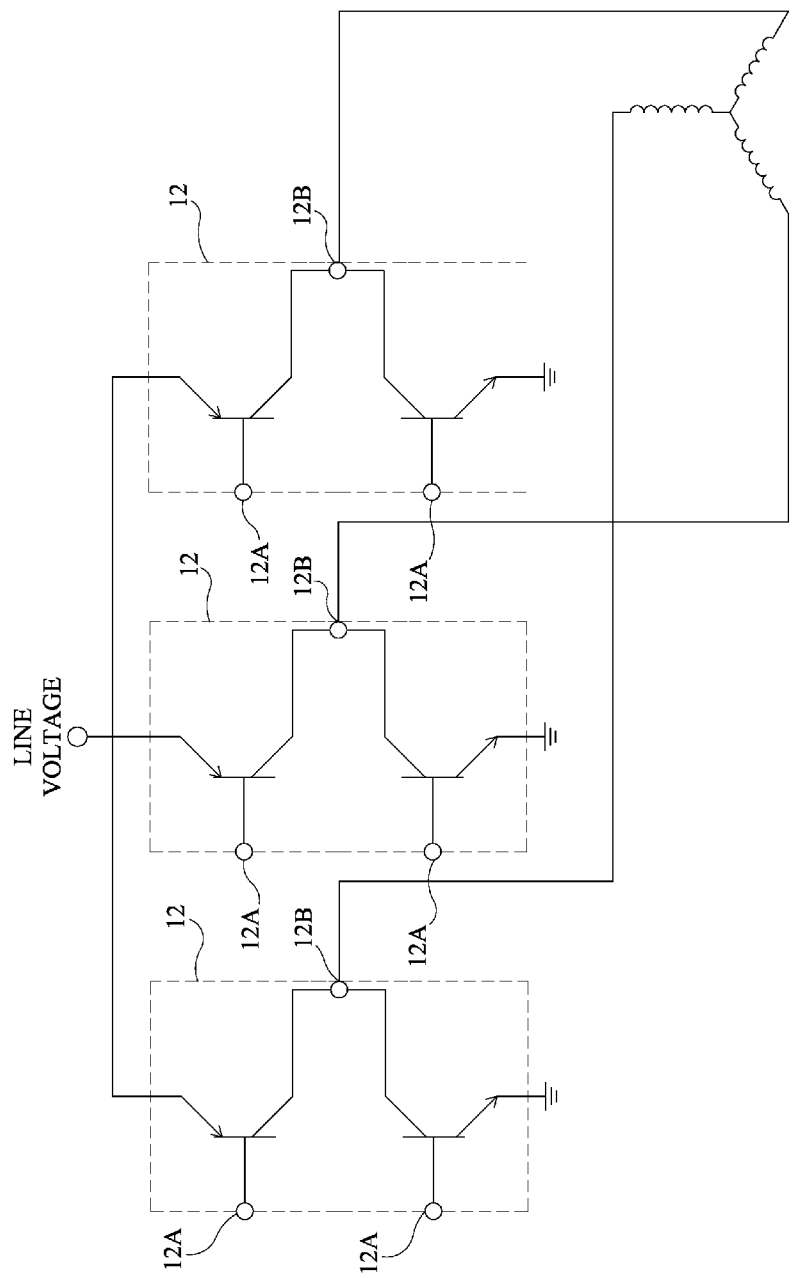
FIG. 4 is a circuit schematic of three drive stages' high-side and low-side transistors in a three-phase circuit configuration in accordance with another embodiment of the present invention.

Referring now to FIG. 4, three H-bridge circuit drive stages 12 are coupled together to provide a three-phase power output at the stages' outputs 12B. Such three phase output can be in a Y-configuration (as shown) or in a delta configuration without departing from the scope of the present invention.

Figure 5:
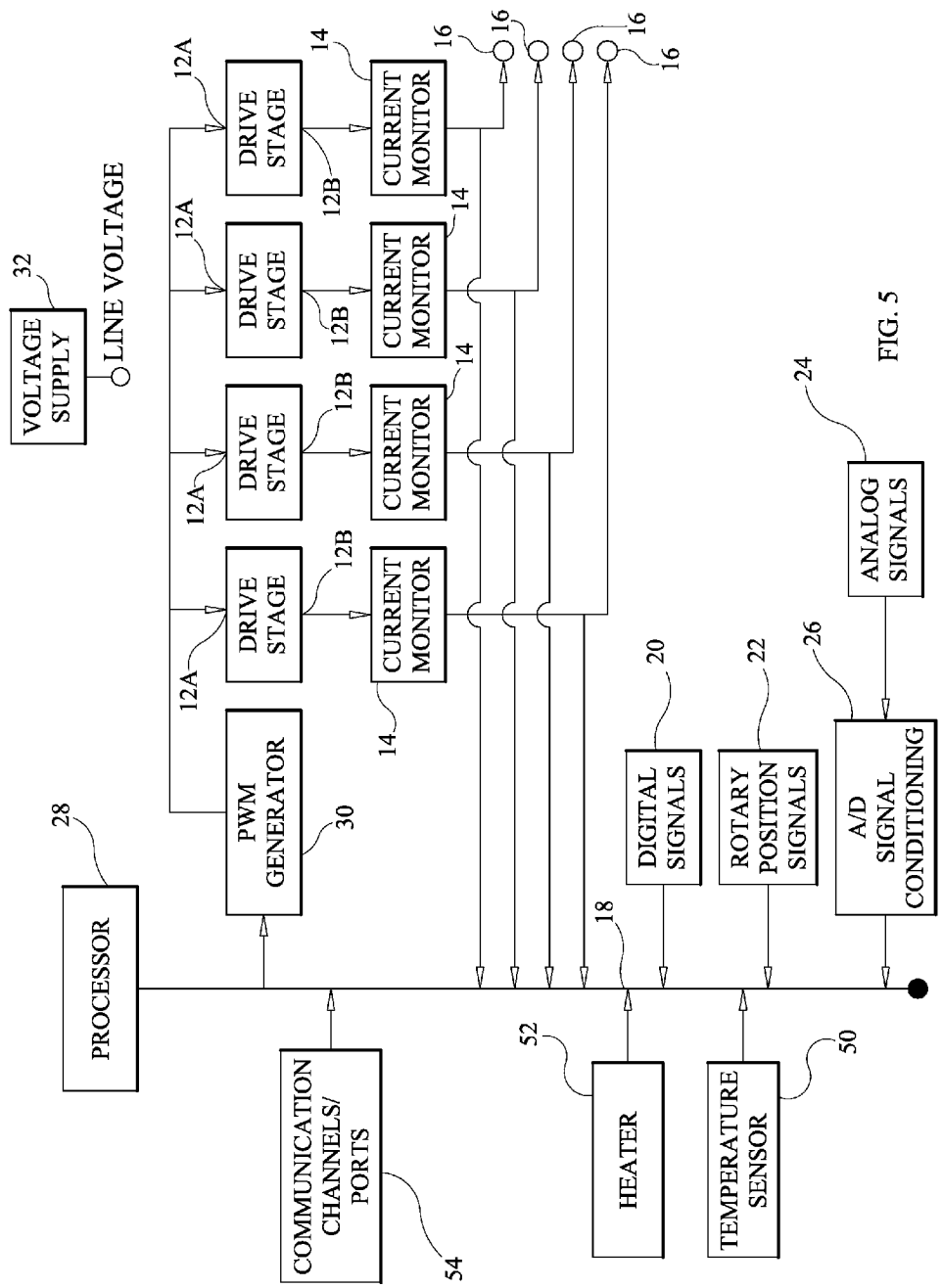
FIG. 5 is a block diagram of a reconfigurable drive current system in accordance with another embodiment of the present invention.

The reconfigurable drive current system of the present invention can include additional capabilities as illustrated in FIG. 5. For example, a temperature sensor 50 can be provided to monitor the temperature of the system. A heater 52 can be provided to generate heat for the components of the system when the system will be exposed to extremely cold environments (e.g., space). Sensor 50 and heater 52 can be coupled to one another (e.g., directly or indirectly through bus 18) such that heater 52 is activated/deactivated predicated on the output of sensor 50. Processor 28 could be used to activate/deactivate heater 52 predicated on signals received from sensor 50. Programming for processor 28 could be provided off-line or in an on-line fashion. For on-line programming, one or more communication channels/ports 54 can be coupled to bus 18. Communication channel 54 is representative of hardwired connections and/or wireless connections, either or both of which can be used without departing from the scope of the present invention.

The advantages of the present invention are numerous. The reconfigurable drive current system will eliminate the need to design spacecraft-specific drive avionics. One or more of the drive current systems could be configured to support a wide variety of spacecraft systems. Configuration for a variety of spacecraft systems can be achieved by simply changing hardware configurations and/or couplings of the drive stages.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. A reconfigurable drive current system, comprising:
   a plurality of drive stages, each of said drive stages having an input and an output associated therewith, each of said drive stages including a high-side transistor and a low-side transistor, each of said drive stages generating a current at said output thereof based on a signal supplied to said input thereof;
   a plurality of current monitors, each of said current monitors coupled to said output associated with a dedicated one of said drive stages for measuring said current produced only by said dedicated one of said drive stages associated therewith;
   a plurality of input channels adapted to receive input signals from state-monitoring devices coupled to devices powered by said current produced by said drive stages, said input channels including a first channel adapted to receive input signals generated by digital types of the state-monitoring devices, a second channel adapted to receive input signals generated by rotary position types of the state-monitoring devices, and a third channel adapted to receive input signals generated by analog types of the state-monitoring devices, wherein said drive stages, said current monitors, and said input channels are identical for a variety of the state-monitoring devices and a variety of the devices powered by said current produced by said drive stages;
   a processor coupled to said plurality of input channels and to each of said current monitors wherein, for each of said drive stages, said processor generates a single drive signal using at least one of said input signals and said current measured by one of said current monitors associated with said dedicated one of said drive stages; and
   a pulse width modulation generator coupled to said processor and each of said drive stages wherein, for each of said drive stages, said pulse width modulation generator adjusting said single drive signal as a function of time to thereby generate said signal supplied to said input thereof.

2. A reconfigurable drive current system as in claim 1, wherein two of said drive stages are connected together to define an H-bridge circuit configuration.

3. A reconfigurable drive current system as in claim 1, wherein three of said drive stages are connected together to define a three-phase drive circuit configuration.

4. A reconfigurable drive current system as in claim 1, further comprising a temperature sensor coupled to said processor.

5. A reconfigurable drive current system as in claim 1, further comprising a heater coupled to said processor.

6. A reconfigurable drive current system as in claim 1, further comprising:
- a temperature sensor for sensing ambient temperature; and
- a heater coupled to said temperature sensor wherein operation of said heater is based on said ambient temperature.

7. A reconfigurable drive current system as in claim 1, further comprising at least one communications channel coupled to said processor.

8. A reconfigurable drive current system, comprising:
- a plurality of drive stages, each of said drive stages having an input and an output associated therewith, each of said drive stages including a high-side transistor and a low-side transistor, each of said drive stages generating a current at said output thereof based on a signal supplied to said input thereof;
- a plurality of current monitors, each of said current monitors coupled to said output associated with a dedicated one of said drive stages for measuring said current produced by said dedicated one of said drive stages associated therewith;
- a plurality of input channels adapted to receive input signals from state-monitoring devices coupled to devices powered by said current produced by said drive stages, said input channels including a first channel adapted to receive input signals generated by digital types of the state-monitoring devices, a second channel adapted to receive input signals generated by rotary position types of the state-monitoring devices, and a third channel adapted to receive input signals generated by analog types of the state-monitoring devices, wherein said drive stages, said current monitors, and said input channels are identical for a variety of the state-monitoring devices and a variety of the devices powered by said current produced by said drive stages;
- a processor coupled to said plurality of input channels and to each of said current monitors wherein, for each of said drive stages, said processor generates a single drive signal using at least one of said input signals and said current measured by one of said current monitors associated with said dedicated one of said drive stages;
- a pulse width modulation generator coupled to said processor and each of said drive stages wherein, for each of said drive stages, said pulse width modulation generator adjusting said single drive signal as a function of time to thereby generate said signal supplied to said input thereof;
- a temperature sensor for sensing ambient temperature;
- a heater coupled to said temperature sensor wherein operation of said heater is based on said ambient temperature; and
- at least one communications channel coupled to said processor.

9. A reconfigurable drive current system as in claim 8, wherein two of said drive stages are connected together to define an H-bridge circuit configuration.

10. A reconfigurable drive current system as in claim 8, wherein three of said drive stages are connected together to define a three-phase drive circuit configuration.

11. A reconfigurable drive current system, comprising:
- a plurality of drive stages, each of said drive stages having an input and an output associated therewith, each of said drive stages including a high-side transistor and a low-side transistor, each of said drive stages generating a current at said output thereof based on a signal supplied to said input thereof;
- a data bus;
- a plurality of current monitors, each of said current monitors coupled to said output associated with a dedicated one of said drive stages for generating a current measurement indicative of said current produced only by said dedicated one of said drive stages associated therewith, each of said current monitors coupled to said data bus wherein said current measurement is available on said data bus;
- a plurality of input channels coupled to said data bus and adapted to receive input signals from state-monitoring devices coupled to devices powered by said current produced by said drive stages wherein said input signals are available on said data bus, said input channels including a first channel adapted to receive input signals generated by digital types of the state-monitoring devices, a second channel adapted to receive input signals generated by rotary position types of the state-monitoring devices, and a third channel adapted to receive input signals generated by analog types of the state-monitoring devices, wherein said drive stages, said current monitors, and said input channels are identical for a variety of the state-monitoring devices and a variety of the devices powered by said current produced by said drive stages;
- a processor coupled to said data bus wherein, for each of said drive stages, said processor generates a single drive signal using at least one of said input signals and at least one said current measurement wherein said single drive signal is available on said data bus; and
- a pulse width modulation generator coupled to said data bus and each of said drive stages wherein, for each of said drive stages, said pulse width modulation generator adjusting said single drive signal as a function of time to thereby generate said signal supplied to said input thereof.

12. A reconfigurable drive current system as in claim 11, wherein two of said drive stages are connected together to define an H-bridge circuit configuration.

13. A reconfigurable drive current system as in claim 11, wherein three of said drive stages are connected together to define a three-phase drive circuit configuration.

14. A reconfigurable drive current system as in claim 11, further comprising a temperature sensor coupled to said data bus.

15. A reconfigurable drive current system as in claim 11, further comprising a heater coupled to said data bus.

16. A reconfigurable drive current system as in claim 11, further comprising:

a temperature sensor coupled to said data bus for generating an ambient temperature measurement wherein said ambient temperature measurement is available on said data bus; and a heater coupled to said data bus wherein operation of said heater is based on said ambient temperature measurement.

17. A reconfigurable drive current system as in claim 11, further comprising at least one communications channel coupled to said data bus.

18. A reconfigurable drive current system, comprising:

a plurality of drive stages, each of said drive stages having an input and an output associated therewith, each of said drive stages including a high-side transistor and a low-side transistor, each of said drive stages generating a current at said output thereof based on a signal supplied to said input thereof;

a dedicated current monitor associated with each of said drive stages, each said dedicated current monitor coupled to said output associated with a single one of said drive stages for measuring said current produced only by said single one of said drive stages associated therewith;

a plurality of input channels adapted to receive input signals from state-monitoring devices coupled to devices powered by said current produced by said drive stages, said input channels including a first channel adapted to receive input signals generated by digital types of the state-monitoring devices, a second channel adapted to receive input signals generated by rotary position types of the state-monitoring devices, and a third channel adapted to receive input signals generated by analog types of the state-monitoring devices, wherein a combination of said drive stages, said current monitors, and said input channels is identical for a variety of the state-monitoring devices and a variety of the devices powered by said current produced by said drive stages;

a processor coupled to said plurality of input channels and to each said dedicated current monitor wherein, for each of said drive stages, said processor generates a single drive signal using at least one of said input signals and said current measured by said dedicated current monitor associated therewith; and a pulse width modulation generator coupled to said processor and each of said drive stages wherein, for each of said drive stages, said pulse width modulation generator adjusting said single drive signal as a function of time to thereby generate said signal supplied to said input thereof.

19. A reconfigurable drive current system as in claim 18, further comprising:

a temperature sensor for sensing ambient temperature; and a heater coupled to said temperature sensor wherein operation of said heater is based on said ambient temperature.

20. A reconfigurable drive current system as in claim 18, further comprising at least one communications channel coupled to said processor.

* * * * *